United States Patent
Ashline

(10) Patent No.: US 6,931,669 B2
(45) Date of Patent: Aug. 23, 2005

(54) HEAD RESTRAINT DEVICE WITH RIGID MEMBER FOR USE WITH A HIGH-PERFORMANCE VEHICLE

(75) Inventor: Trevor P. Ashline, Mooresville, NC (US)

(73) Assignee: Safety Dynamics, LLC, Mooresville, NC (US)

( * ) Notice: Subject to any disclaimer, the term of this patent is extended or adjusted under 35 U.S.C. 154(b) by 0 days.

(21) Appl. No.: 10/728,003

(22) Filed: Dec. 3, 2003

(65) Prior Publication Data

US 2005/0015859 A1 Jan. 27, 2005

Related U.S. Application Data

(63) Continuation-in-part of application No. 10/660,230, filed on Sep. 9, 2003, and a continuation-in-part of application No. 10/335,341, filed on Dec. 31, 2002, now Pat. No. 6,871,360, and a continuation-in-part of application No. 29/161,634, filed on May 31, 2002, said application No. 10/335,341, and a continuation-in-part of application No. 09/993,839, filed on Nov. 16, 2001, now Pat. No. 6,499,149, and a continuation-in-part of application No. 29/161,634, and a continuation-in-part of application No. 09/837,215, filed on Apr. 19, 2001, now abandoned.

(60) Provisional application No. 60/409,085, filed on Sep. 9, 2002.

(51) Int. Cl.[7] ................................................. A42B 1/24
(52) U.S. Cl. ...................... 2/422; 2/425; 2/468; 2/411; 2/421; 280/801.1; 280/290
(58) Field of Search ........................... 2/425, 468, 421, 2/416, 411, 6.1, 6.2, 422; 244/122 AG, 122 R, 122 B; 280/290, 801.1, 748; 297/464, 465, 216.12, 485, 216.13, 393

(56) References Cited

U.S. PATENT DOCUMENTS

| | | | | |
|---|---|---|---|---|
| 3,278,230 A | * | 10/1966 | Boyce et al. | 297/465 |
| 3,499,681 A | * | 3/1970 | O'Neal et al. | 297/465 |
| 4,923,147 A | * | 5/1990 | Adams et al. | 244/122 AG |
| 5,715,541 A | * | 2/1998 | Landau | 2/425 |
| 6,009,566 A | * | 1/2000 | Hubbard | 2/468 |
| 6,308,345 B1 | * | 10/2001 | Williams, Jr. | 2/468 |
| 6,588,022 B1 | * | 7/2003 | Anders et al. | 2/421 |
| 6,751,809 B1 | * | 6/2004 | Cooper et al. | 2/421 |
| 6,810,535 B1 | * | 11/2004 | Moloney | 2/411 |
| 2002/0043831 A1 | * | 4/2002 | Alsup | 297/216.12 |

FOREIGN PATENT DOCUMENTS

| | | | | |
|---|---|---|---|---|
| GB | 2225708 A | * | 6/1990 | A41D/13/00 |
| WO | WO 9103178 A1 | * | 3/1991 | A42B/3/00 |

* cited by examiner

Primary Examiner—Rodney M. Lindsey
(74) Attorney, Agent, or Firm—Everman Law Firm, PA; Gregory R. Everman

(57) ABSTRACT

A restraint device for controlling the head of a driver during a high-performance vehicle collision. The device includes a rigid member positioned along the back of the driver, a tether for attaching the member to the driver's helmet, and a strap for anchoring the device. The vehicle's seat belt assembly or the driver's own body, such as his torso, waist or legs, may be used to anchor the device. During a vehicle collision, forces from the head are transferred through the device (i.e. tether, rigid member, and strap) into the anchor in order to resist forward movement and downward rotation of the driver's head.

20 Claims, 18 Drawing Sheets

HEAD RESTRAINT DEVICE WITH RIGID MEMBER FOR USE WITH A HIGH-PERFORMANCE VEHICLE

CROSS REFERENCE TO RELATED APPLICATIONS

This is a continuation-in-part of application Ser. No. 10/660,230, filed Sep. 9, 2003, which claims the benefit of U.S. Provisional Application No. 60/409,085, filed Sep. 9, 2002, and is a continuation-in-part of application Ser. No. 10/335,341, filed Dec. 31, 2002 now U.S. Pat. No. 6,871,360, and is a continuation-in-part of Application No. 29/161,634, filed May 31, 2002, and is a continuation-in-part of application Ser. No. 09/993,839, filed Nov. 16, 2001, now U.S. Pat. No. 6,499,149, and is a continuation-in-part of application Ser. No. 09/837,215, filed Apr. 19, 2001, now abandoned, each of which is hereby incorporated by reference.

BACKGROUND OF THE INVENTION

1. Filed of the Invention

The present invention relates to the field of safety devices for high-performance vehicles and, more specifically, to a restraint device for controlling a driver's head and neck when the driver is subjected to high deceleration forces, such as those forces that may occur during a frontal collision of a high-performance vehicle.

2. Description of the Related Art

Traditionally, drivers of high-performance vehicles have employed a standard five or six point seat belt assembly, in which all of the belts tie into a common buckle, to restrain the driver during a collision. Although the seat belt assembly is effective in constraining the torso of the driver to the seat assembly during a collision, it does not restrain the driver's head or neck. As such, during an impact, particularly a frontal or angular frontal impact, the driver's head may continue forward from the seat assembly then violently rotate downward towards the driver's chest. This uncontrolled movement of the driver's head has resulted in serious injury and death.

Injury may occur by one of the following ways. First, the driver's head may move forward and downward until it strikes against an interior component of the vehicle, such as the steering wheel. Moreover, downward rotation of the driver's head may cause high tension forces on the spine and neck. Where the tension forces are sufficiently high, a basilar skull fracture may occur, a condition in which the base of the skull cracks from the stem. Finally, during recoil, the driver's head may be flung rearward against an interior component of the car, typically the seating assembly.

One proposed approach to reduce these types of injuries was to equip high-performance vehicles with driver-side airbags. However, this approach is problematic in that after the initial impact, the inflated airbag would block the driver's field of vision. Another problem is that the air bags would have to deploy much more quickly, and with more explosive force, than it would have to with conventional vehicles due to the great speed at which high-performance vehicles are operated.

Other efforts to improve safety for drivers of high-performance vehicles include devices configured to restrain the driver's head and neck during a collision. Two of these devices, the Hanns Device and the Hutchens Device® have been mandated by NASCAR as required safety equipment.

The Hanns Device, described in U.S. Pat. No. 6,009,566 to Robert P. Hubbard, includes a rigid yoke that is worn around the neck and over the shoulders of a driver and to which a safety helmet is tethered. Unfortunately, due to the bulky and rigid structure of the yoke, the Hanns Device itself may inadvertently become a safety hazard by impeding the driver from exiting the vehicle, particularly during an emergency situation.

With high-performance vehicles, egress is made through the driver-side window frame. However, the stiff and bulky yoke of the Hanns Device may impede the driver from exiting the vehicle by making it more difficult to fit through the driver-side window frame. Consequently, valuable time in removing the driver from a dangerous crash site and to treat the driver may be lost. This need to quickly exit the vehicle is particularly critical when the driver and/or vehicle are on fire or when the driver is seriously injured.

Another disadvantage of the Hanns Device is that the driver's seat must be modified in order to accommodate the bulky yoke. Accordingly, the device can not be used in a vehicle until costly modification to the vehicle's seat assembly has been made.

Still another disadvantage of the Hanns Device is that some drivers consider the rigid yoke as being uncomfortable and that the yoke restricts their mobility when operating the vehicle. Moreover, some drivers have also noted that yoke restricts their peripheral vision. These limitations of the Hanns Device may potentially lead to driver error and hence be the cause of a vehicle crash.

The Hutchens Device®, described in U.S. Pat. No. 6,499,149 to Trevor P. Ashline, comprises a series of straps forming a harness that is worn by a driver. The harness is tethered to the driver's helmet at one end and anchored to either the vehicle's seat belt assembly or, in an alternative configuration, around the driver's legs.

In addition to providing protection to the driver during a collision, the Hutchens Device® overcomes many of the disadvantages of the prior art. For example, being by lightweight and by being configured of flexible straps, the Hutchens Device® does not interfere with a driver's exiting from a vehicle. As such, the driver may freely exit the vehicle upon releasing the vehicle's seat belt assembly.

Moreover, the Hutchens Device® does not require any modification to the vehicle's seat assembly in order to properly function. Accordingly, the device is ready for use upon purchase and is a safety solution affordable to all drivers.

Notwithstanding the benefits provided by the Hutchens Device®, due to the dangerous nature of operating a high-performance vehicle, particularly in the course of racing, there is a continual need for providing improved and/or alternative restraint devices. Such restraint devices should not only provide the benefit of controlling the driver's head during a collision, but should also be simplistic in use, inexpensive, not interfere with a driver's operation of a high-performance vehicle, and not impede the driver's egress from the vehicle.

BRIEF SUMMARY OF THE INVENTION

To achieve the foregoing and other objects, the present invention, as embodied and broadly described herein, provides various embodiments of restraint device for controlling the head of a driver during a collision while operating a vehicle.

In the broadest sense, the invented restraint device includes a member, a tether and a strap. The tether attaches the member to a helmet being worn by the driver. The strap attaches the member to an anchor. The anchor may be the driver's body and/or the vehicles seat belt assembly. In particular, the anchor may be the driver's torso, waist and/or legs. The member may be positioned along the driver's back.

Also in the broadest sense, the invented restraint device provides a method for restraining a driver during a vehicle collision. The method includes providing a member, tether and strap. The tether is attached to a helmet and the strap is attached to an anchor. The member may be positioned along the back of the driver. The anchor may be the driver's body and/or the vehicles seat belt assembly. In particular, the anchor may be the driver's torso, waist and/or legs.

BRIEF DESCRIPTION OF THE DRAWINGS

The above described and other features, aspects, and advantages of the present invention are better understood when the following detailed description of the invention is read with reference to the accompanying drawings, wherein.

DESCRIPTION OF THE PREFERRED EMBODIMENTS

Figure 1:
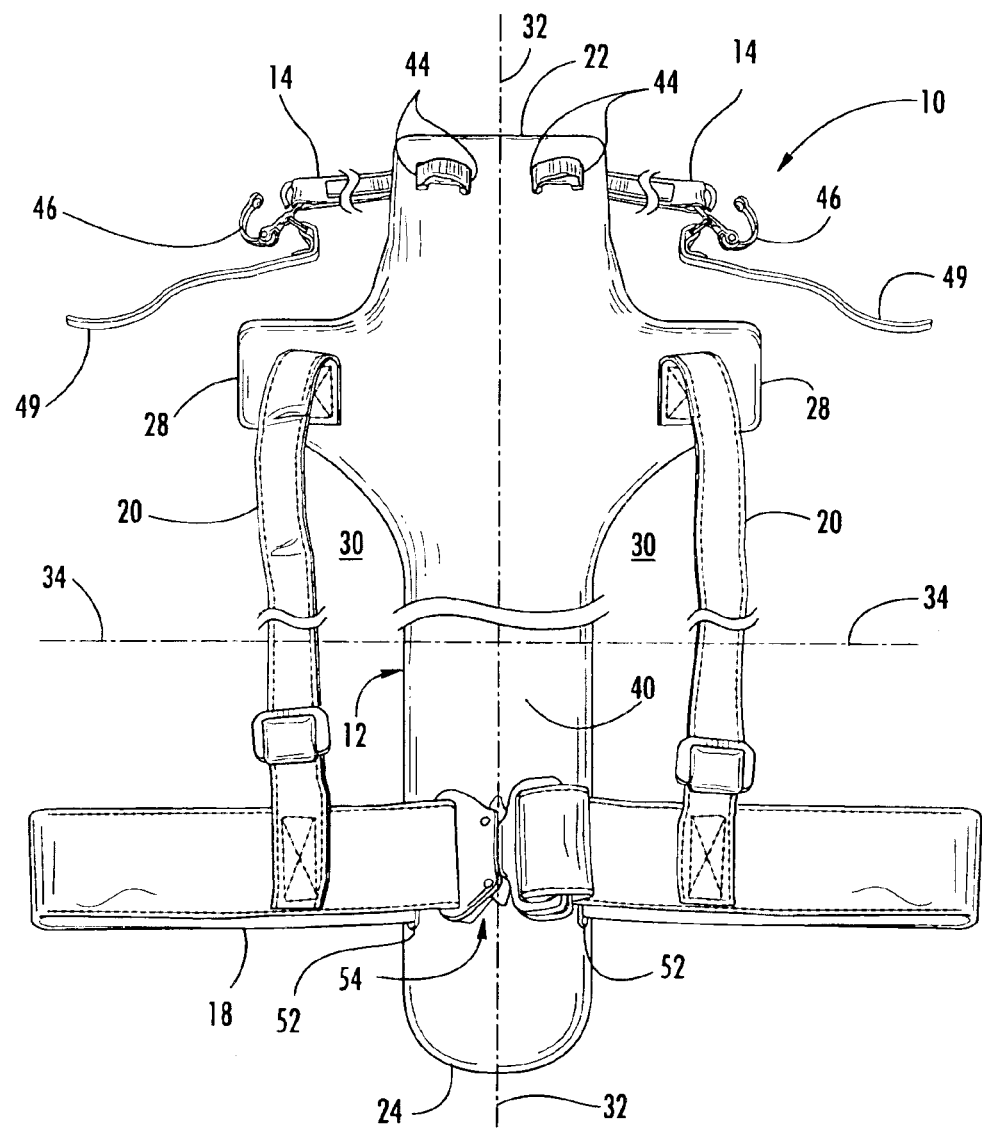
FIG. 1 is a front view of a restraint device having a strap for anchoring the device to the torso of a driver in accordance with an exemplary embodiment of the present invention.

The present invention will now be described more fully hereinafter with reference to the accompanying drawings in which preferred embodiments of the invention are shown. This invention may, however, be embodied in many different forms and should not be considered as limited to the embodiments set forth herein. These exemplary embodiments are provided so that this disclosure will be both thorough and complete, and will fully convey the scope of the invention to those skilled in the art. Like reference numbers refer to like elements throughout the various FIGS.

The present invention describes a restraint device that provides protection to a driver's head and neck beyond that offered by just a vehicle's seat belt assembly. During an impact, a standard 5 or 6 point seat belt assembly will limit forward advancement of a driver's torso from the seat assembly. However, the driver's head, unrestrained, is free to continue forward and caused to rotate about the neck thereby placing large tension loads on the spine and neck. Accordingly, the driver's head may continue forward at a high rate until it impacts against the steering wheel or other interior component of the vehicle, injuring the driver. Furthermore, the downward rotation of the head may place such large loads on the spine and neck that a basilar skull fracture may occur, a condition in which the base of the skull cracks from stress and often also causing trauma to arteries and to the spinal cord. Finally, the driver's head may recoil from its forward position and be flung backwards into the seat assembly or into another interior component of the vehicle.

In various embodiments, the present invention controls the driver's head and neck when the driver is subjected to large deceleration forces that occur during a high-performance vehicle collision. More specifically, the restraint device opposes the deceleration forces in order to limit forward movement and downward rotation of the driver's head, thereby decreasing loading to the spine and neck and reducing the likelihood of injury to the driver. By offsetting loading to the driver, the present invention is effective in protecting a driver's head and neck during a frontal or angular frontal collision. The present invention may offer some benefit during pure side or rear impacts to the vehicle, however, it may have less effectiveness. The term "driver" as used throughout this specification is to be construed as being inclusive of any person, particularly those that are an occupant within a vehicle.

In various embodiments, the present invention includes a restraint device having a rigid member (described in detail further below) positioned along a driver's back, at least one tether for attaching the member to a helmet, and at least one strap for anchoring the device. As used herein, the term "anchor" includes a driver's body, such as the driver's legs, hips and/or torso, and/or also a component of a vehicle, such as the vehicle's seat belt assembly. In specific embodiments, alternative configurations of the present invention are presented for attaching the device to various anchors.

The term "helmet", as used herein, includes any article wearable on a driver's head. For example, and not to be construed as being limiting, "helmet" includes conventional head protective devices such as racing helmets having a hard exterior shell for protecting a driver's head against impact. Helmet also includes articles that do not have a hardened exterior shell, such as a skullcap, an example of which is sold by Speedway Safety Equipment of Hueytown, Ala.

Figure 3:
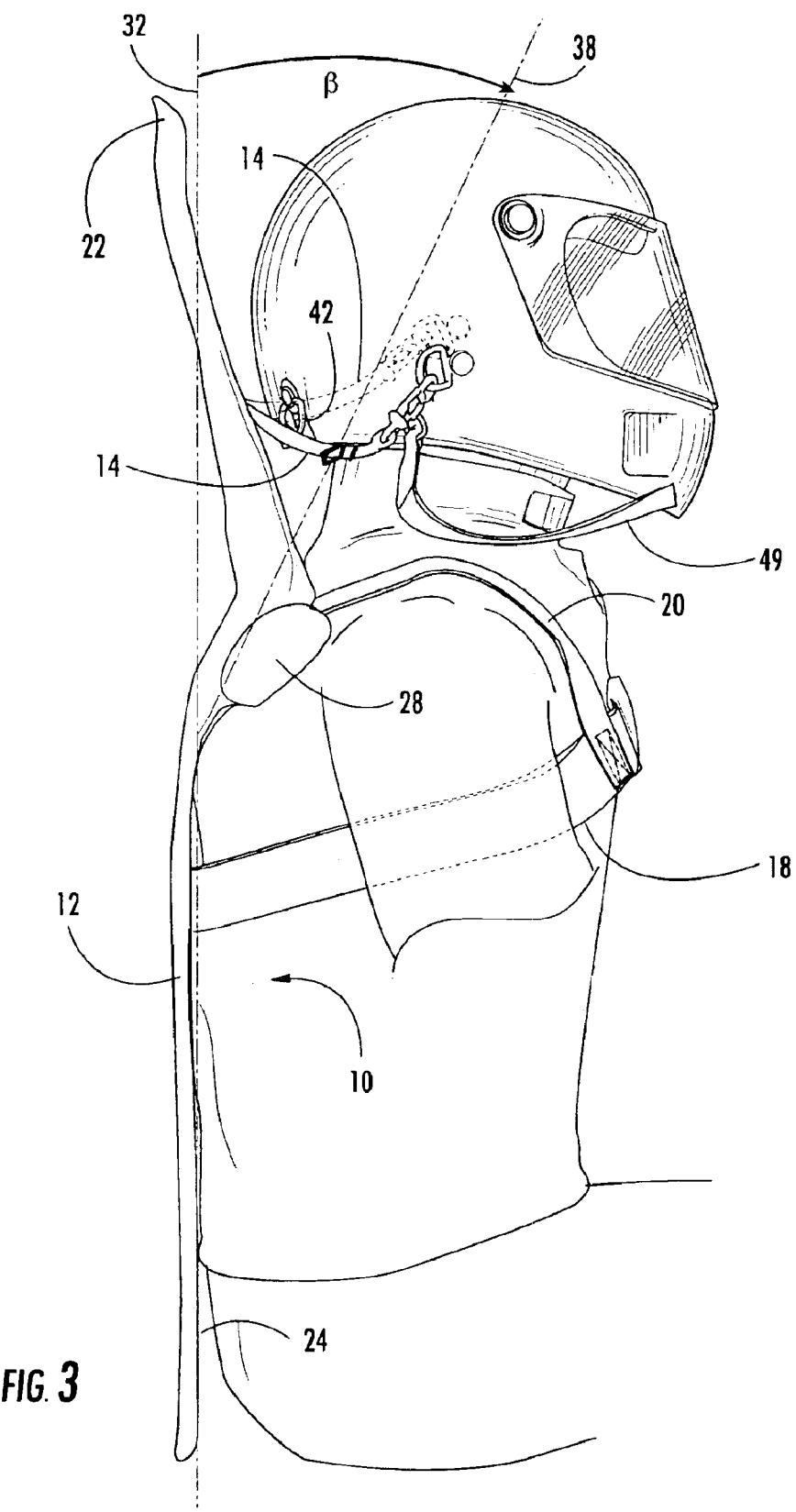
FIG. 3 is a side view of a restraint device, illustrating alternative embodiments of the restraint device, including having a rigid member that extends fully from a driver's buttocks to above his helmet and which is contoured for accommodating the driver's shoulders and helmet, having tethers formed of a plurality of sections, having a multiplicity of tethers attached to the helmet, and illustrating that the device may hold the driver's head at different angles depending on the type of high-performance vehicle being driven, in accordance with an exemplary embodiment of the present invention.

Furthermore, the term "tether", as used herein, refers to any tether, webbing, strap, dashpot/dashpot containing a controllable rheological fluid such as that disclosed in US Patent Application Publication No. 2003/0088906 A1 to Gregg S. Baker, belt, cord, chain, cable, rope, band, or the like, that is adapted to attach an embodiment of the invented restraint device to a helmet. Moreover, a tether may be of one continuous length, as shown in FIG. 1, may be a plurality of tethers, as shown in FIG. 3, and may be comprised of more than one section such as also shown in FIG. 3, for example. As a further example, a tether may be a network of webbing (not shown) that wraps over a helmet at one end and attaches to an embodiment of the invented restraint device at the other end. In still another example, a tether may be a strap that extends from a skull cap that attaches to an embodiment of the invented device. Additionally, a tether may also refer to only the tether section that is attached to an embodiment of the invented device.

The tether is attached to the member and to the helmet. The term "attached", as used herein, includes being affixed; fastened; joined; adjoining; connected; adapted to be attached, affixed, joined, adjoining and/or connected; and/or releaseably attached, affixed, joined, adjoining and/or connected. A non-exhaustive list of means/methods for attaching include mechanical fasteners, clips, straps, rings, adhesive, hooks, weaving, tying, encircling, for example.

In the various embodiments, at least one strap is provided for attaching the restraint device to an anchor. The term "strap", as used herein, refers to any strap, webbing, belt, cord, chain, cable, rope, band, or the like. The strap is attached (as defined above and illustrated herein) to the member and to the anchor. Specific examples of attaching the strap to the anchor are illustrated in the various embodiments below.

The term "strap" includes one strap, as shown in FIG. 1, and also a plurality of straps, such as shown in FIG. 3. It is to be understood that for each of the embodiments described herein, that a plurality of straps may be used in place of the illustrated single strap. It is also to be understood that the strap may be comprised of a plurality of sections.

Not to be construed as limiting, the strap and tether are preferably made of polyester webbing, having suitable strength and performance characteristics necessary for operating under the load conditions associated with high-performance vehicle racing. Moreover, the strap and tether may be provided with adjustment means, such as for example a webbing slide adjuster, a 3-bar ring, or other article, for adjusting the length of the strap or tether in order to fit and seat the device properly to a driver.

In the various embodiments described herein, the present invention is light-weight, and easily carried on a driver, such that the invented device does not inhibit egress into and out of a vehicle. Moreover, the present invention does not block a driver's field of vision and allows for a driver to rotate his head in order to look in the various directions necessary for racing a vehicle.

Figure 2:
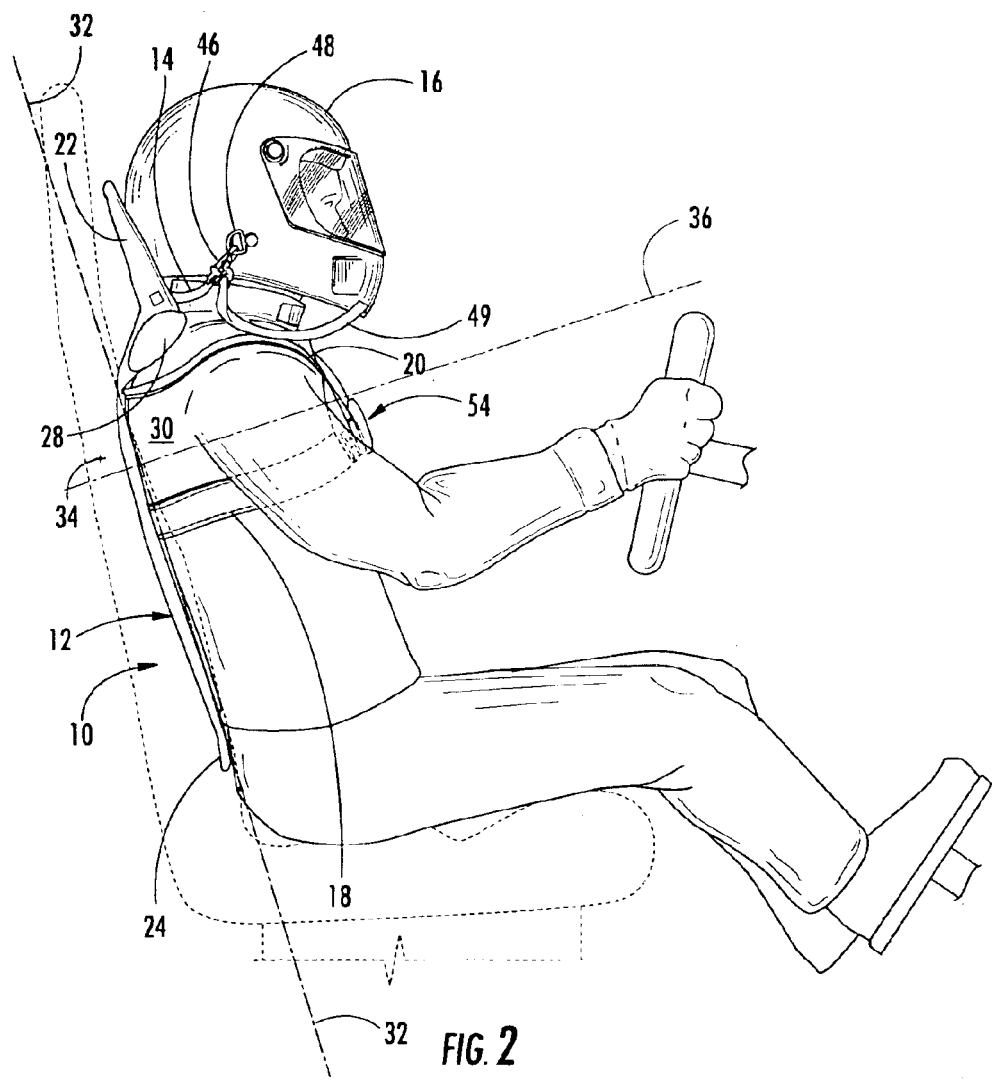
FIG. 2 is a side view of the restraint device of FIG. 1, showing the device in position on a driver during normal operation of a vehicle.

Referring to FIGS. 1 and 2 of the drawings, the invented restraint device 10 includes a member 12 positionable along a driver's back, at least one tether 14 for attaching the device 10 to a helmet 16 (FIG. 2), and at least one strap 18 for anchoring the device 10, and optional shoulder straps 20 for holding the device 10 on the driver during vehicle egress and ingress. Although FIGS. 1 and 2 are being principally referred to, the following description of the member 12, tether 14, and shoulder straps 20 is applicable to each of the embodiments disclosed herein. Variations of these elements that are illustrated in only one embodiment are identified by calling out the applicable FIG(S) wherein the variation is shown. As it will be appreciated by those skilled in the art of safety equipment for high-performance vehicles, any variation described in one embodiment may also be applied to any of the other embodiments.

Referring to FIGS. 1 and 2, the term "member" 12 refers to a structure that is configured for being positioned along the back of a driver. The length of the member 12 may vary. That is, the member 12 may have a first section 22 that terminates above the driver's head and a second section 24 that terminates below the driver's buttocks (as shown in FIG. 3), or have any length there-between. Preferably, the first section 22 terminates at the back of the driver's head and the second section 24 terminates at the driver's shoulder blades, or lower. In general, the length of the member 12 is typically between one and four feet, and more typically between eighteen inches and forty inches.

As with the length, the width of the member 12 may also vary. Although not to be construed as limiting, preferably the width (not including lateral extension 28) of the member 12 is at least two inches, more preferably between two and twelve inches and most preferably between three and eight inches. Moreover, the member 12 may have a uniform width (not shown), the first section 22 may be broader in the region behind the helmet in order to provide suitable placement of the tether 14, and/or the second section 24 may be broader (FIG. 8.) in order to position a strap.

The lateral extensions 28 extend a distance along the driver's shoulders in order to provide suitable placement of the shoulder straps 20 and to assist in maintaining the restraint device 10 in position on the driver, particularly during an angular-frontal collision.

Not to be construed as limiting, it is also preferred that the member 12 be sized so that it does not cover the driver's shoulder blades 40 (FIG. 1 shows where the shoulder blades would be located if the device was being worn), which may otherwise potentially cause discomfort to the driver while operating the vehicle and/or interfere with the driver's ability to operate the vehicle. As such, the lateral extensions 28 extend along the shoulders, above the shoulder blades, while the member 12 is sufficiently narrow so as not to interfere with the shoulder blades as it passes there-between.

Moreover, the member 12 may be planar (not shown) or contoured. That is, the member 12 may be linear along its respective longitudinal, lateral, and normal axes 32, 34, 36, or it may be contoured along any of these axes in order to accommodate the driver or the driver's equipment. As an example, the embodiment illustrated in FIG. 2 shows the member 12 contoured along the longitudinal axis 32, accommodating the driver's shoulders, neck and helmet 16.

Furthermore, the member 12 may be angled depending on the type of vehicle being driven. For example, FIG. 3 illustrates the member 12 as being generally vertical for use in stock car racing wherein the driver is seated generally upright, and also indicates by reference line 38 that the upper section 22 may be angled β forward for use with formula one racing wherein the driver is seated in a more reclined position.

The member 12 is rigid and has high-strength in order to resist force loads during a collision. It is to be understood the term rigid means principally rigid and is inclusive of a minor amount of flexibility as the member 12 may exhibit some resiliency due to loads being placed thereon. Notwithstanding, it is preferred that the member 12 have minimal or no elasticity in order to better control the driver's head during a collision and to minimize any rebounding effect.

The member 12 is preferably constructed of carbon fiber, a material that is light-weight, high-strength and has sufficient rigidity. Other materials that yield a high-strength, rigid construction may also be used, such as metal, plastic, and fiberglass, for example. As shown in FIG. 1, the member 12 may be provided with padding 40, cushion, gel pad, fabric, or the like, in order to comfort the driver from the rigid member 12.

For each embodiment of this application, at least one tether 14 is provided for releasably attaching the restraint device 10 to a helmet. For example (not shown in any FIG.), a single tether may extend from the member 12 and attach to one location on the back of the helmet. As another example (illustrated in FIGS. 1 and 2) a single tether 14 may include an intermediate section that is attached to the member 12 while the opposed tether ends are adapted for attachment to the helmet. As a further example, two tethers 14 (shown in FIG. 3) may be used wherein one end of each tether 14 is affixed or attachable to the member 12 and the opposed end is affixed or attachable to the helmet 16. Additional tethers (not shown) may be provided in order to secure the helmet to the member 12. FIG. 3 shows additional D-rings 42 on the helmet 16 for the attachment of additional tethers.

Figure 4:
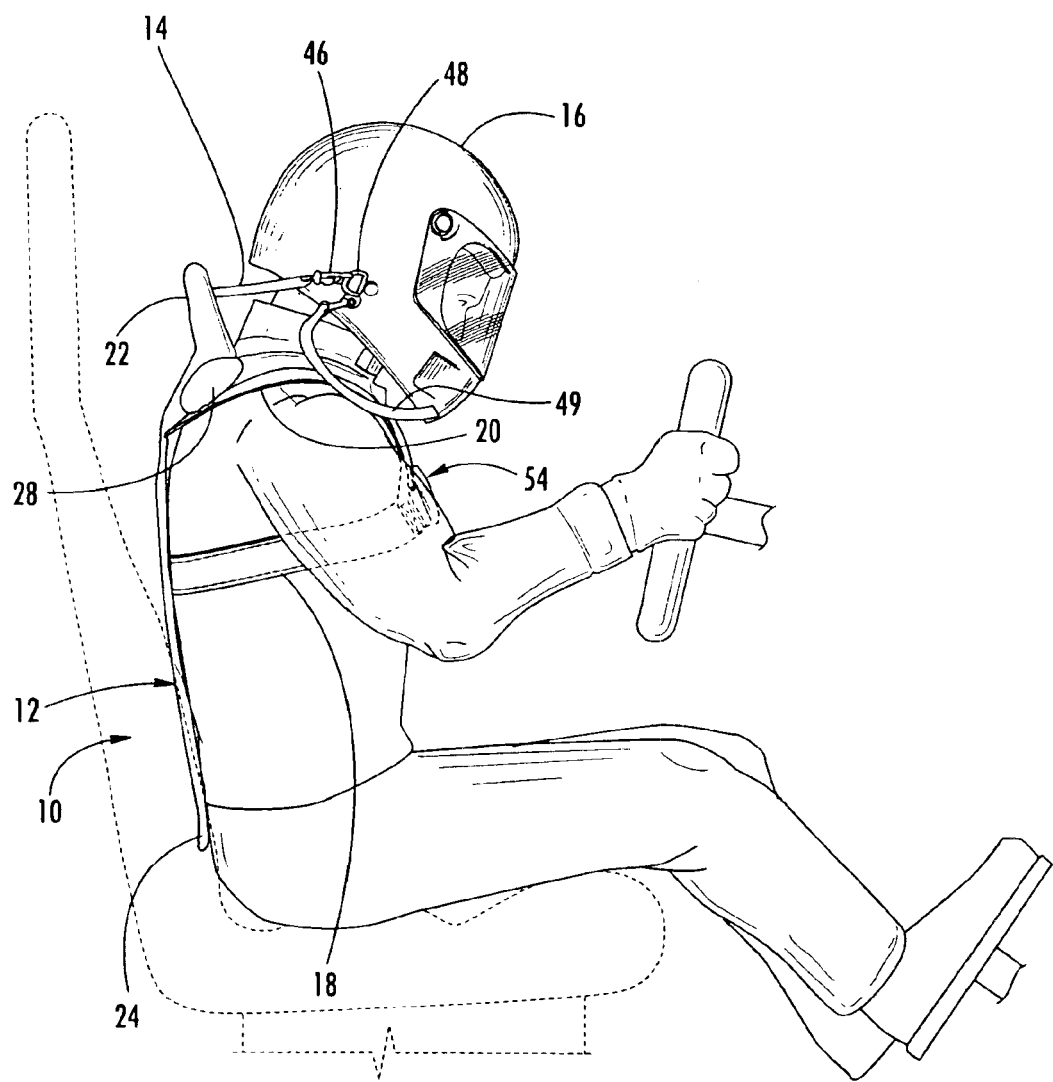
FIG. 4 is a side view of the restraint device of FIG. 1, showing the device restraining a driver's head during a frontal collision.

In each embodiment of the application, the location of tether attachment to the helmet 16 is based upon controlling movement of the driver's head during a collision. That is, reactive loads through the tether 14 oppose forward movement of the driver's head as well as downward rotation of the driver's head, as illustrated in FIG. 4. Not to be construed as limiting, it is preferred to attach the tether 14 to opposing sides of the helmet 16 along a horizontal plane that passes near the combined center of mass of the driver's head and helmet. As it will be appreciated by those skilled in the art of safety devices for high-performance vehicles, specific placement of the tether 14 may vary in accordance with a multitude of factors, such as for example the number of tethers being used and the location at which the tethers are attached to the member, however, the principle of resisting forward and downward movement of the driver's head remains the same.

Referring to FIG. 1, the tether 14 is woven through slots 44 formed in the member 12 while the end sections of the tether 14 extend beyond the member 12. The intermediate section of the tether 14 is affixed to the member 12 by an adhesive in order to fix the tether 14 in place. Quick release clips 46 are provided on the tether end sections for releaseable attachment to D-rings 48 provided on the helmet 16, as shown in FIG. 2. This arrangement allows for the restraint device 10 to be quickly released from the helmet 16 by pulling clip lines 49, thereby opening the quick release clips 46 for detachment from the helmet D-rings 48. It is noted that the clip lines 49 may be taped to the chin portion of the helmet 16 in order to quickly locate the lines 49 and to avoid the lines from becoming inadvertently entangled in the seat belt assembly and restraint device 10.

At least one strap is provided for attaching the restraint device 10 to an anchor. Referring specifically to FIGS. 1 and 2, the device 10 includes a strap 18 that is configured for being secured around a driver's torso, which serves as the anchor. The strap 18 may be affixed, or releaseably attached, to the member 12 by any suitable means. In the illustrated embodiment, the strap 18 is affixed to the member 12 by weaving the strap 18 through slots 52 (FIG. 1) formed in the member 12 and then adhesively affixing the intermediate section of the strap 18 to the member 12. The end sections of the strap 18 extend a sufficient distance beyond the member 12 and are provided with suitable fastening means 54, such as a complementary tongue and buckle, so that they may be fastened together around the driver's torso. Length adjustment of the strap 18 may be allowed for by the fastening means, a webbing tie, or other suitable means, in order to accommodate different drivers.

It is to be understood that the position of the strap 18 along the member 12 may vary such that the strap 18 may encircle the driver's torso (FIGS. 1 and 2), waist, or hips. Moreover, more than one strap encircling the driver may be provided.

Optional shoulder straps 20 may be provided in order to assist in holding the device 10 in place on the driver while the driver is standing or when the driver is entering or exiting the vehicle. The shoulder straps 20 are attached at one end to the lateral extensions 28 and to the strap 18 at the other end, thereby providing an area through which the driver may insert his arms. The attachment may be made in accordance with any of a variety of known means, such as by stitching the shoulder straps 20 to the padding 40 and to the strap 18, as shown. A webbing tie, or other means, may be provided on the shoulder straps 20 for length adjustment as necessary.

Figure 5:
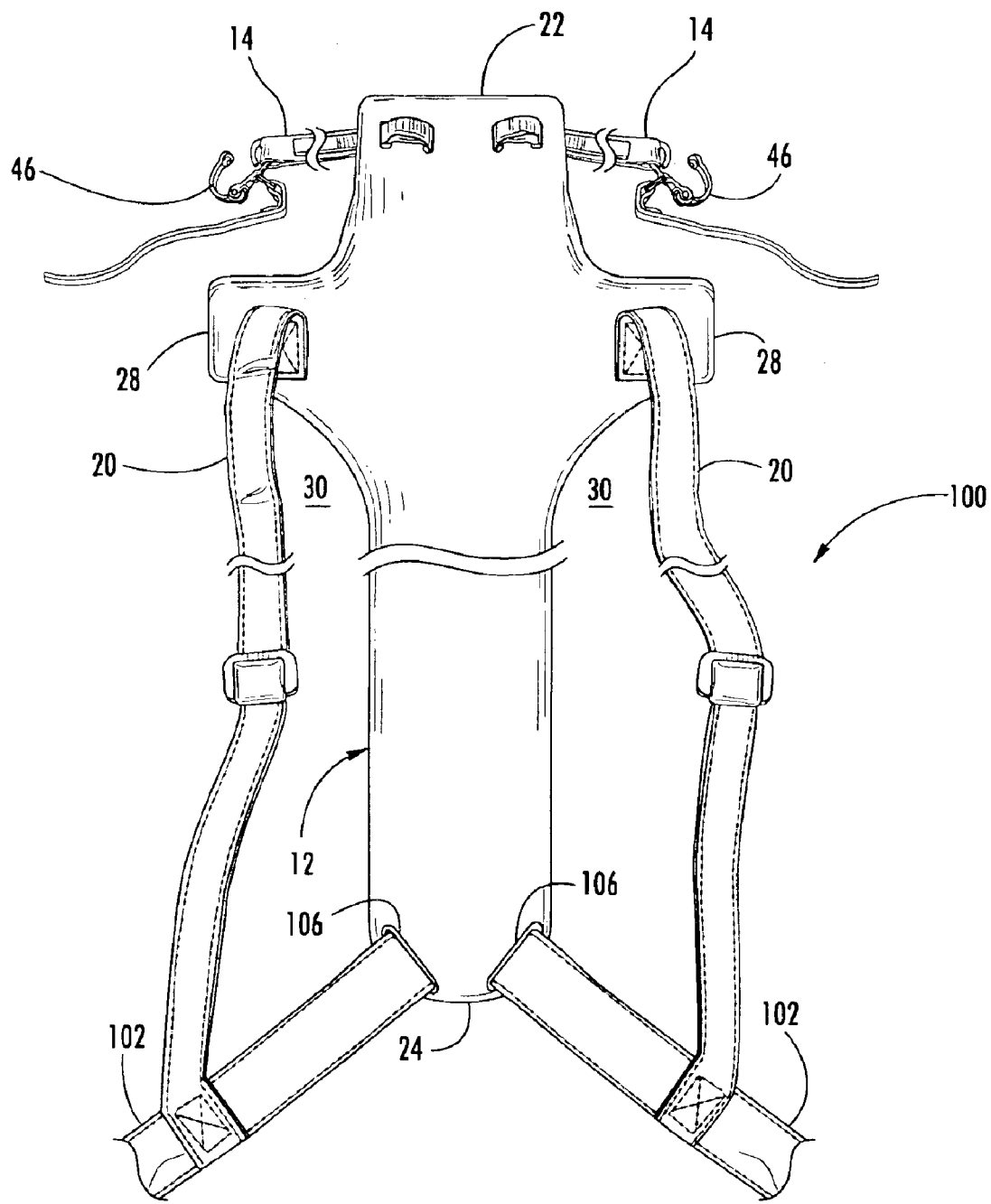
FIG. 5 is a front view of a restraint device having a strap, positionable around the drive's hips, for attachment and anchorage of the device to a vehicle's seat belt assembly, in accordance with an exemplary embodiment of the present invention.
Figure 6:
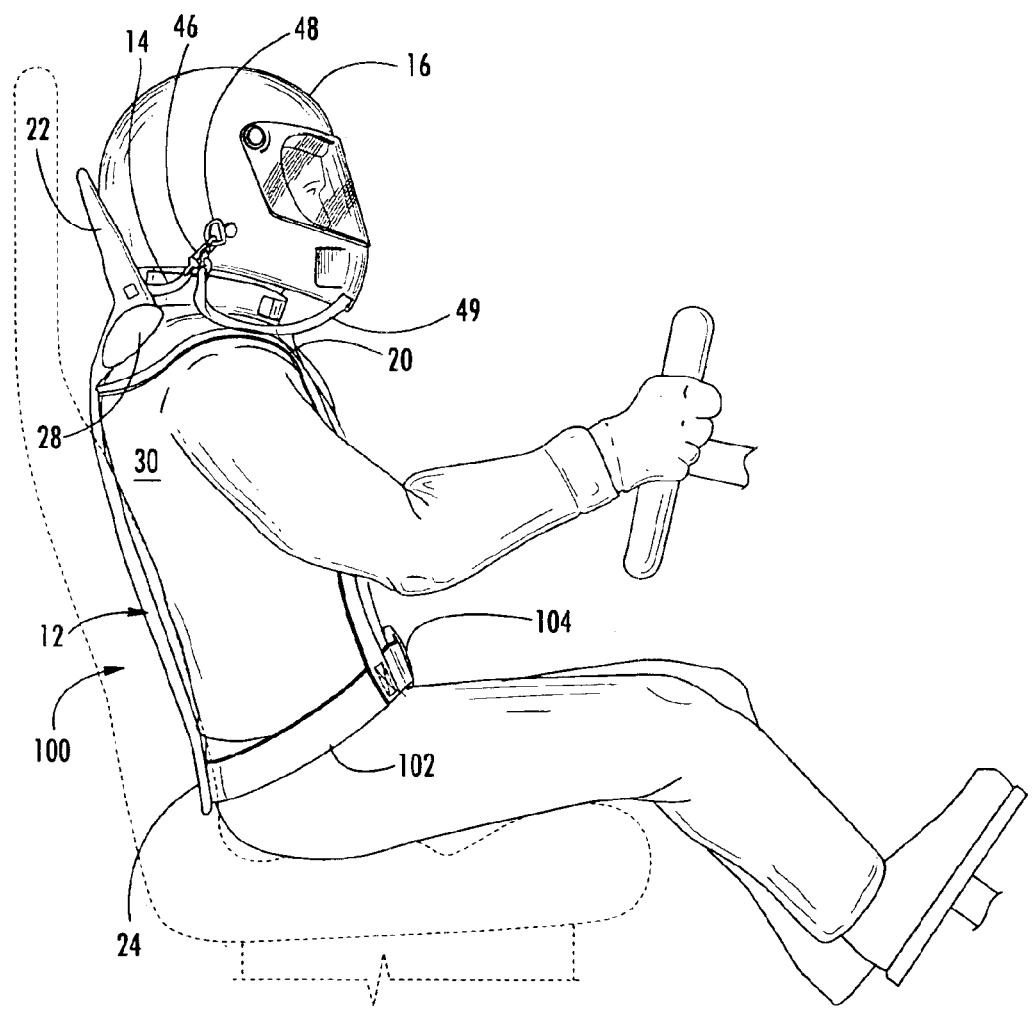
FIG. 6 is a side view of the restraint device of FIG. 5, showing the device in position on a driver during normal operation of a vehicle.

Referring to FIGS. 5 and 6, another embodiment of a restraint device 100 is illustrated. The device 100 comprises a member 12 having lateral extensions 28, tether 14 and optional shoulder straps 20, each of which are as described above.

Figure 7A:
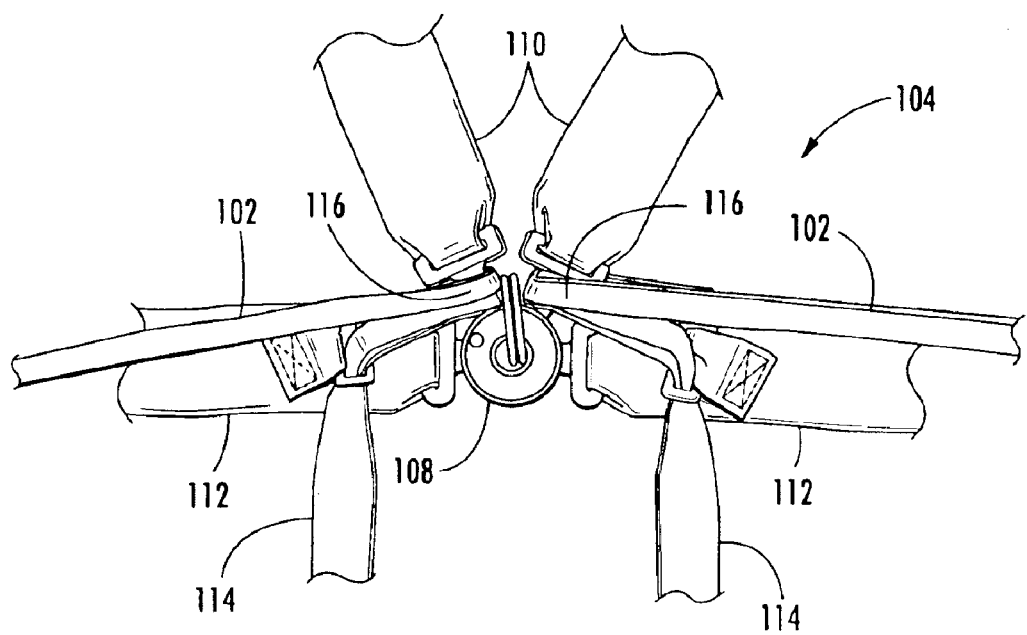
FIG. 7a is a fragmented front view of the restraint device of FIG. 5, showing in particular an arrangement for anchoring the device to the vehicle's seat belt assembly, wherein the strap is secured to the seat belt assembly by harness belts.
Figure 7B:
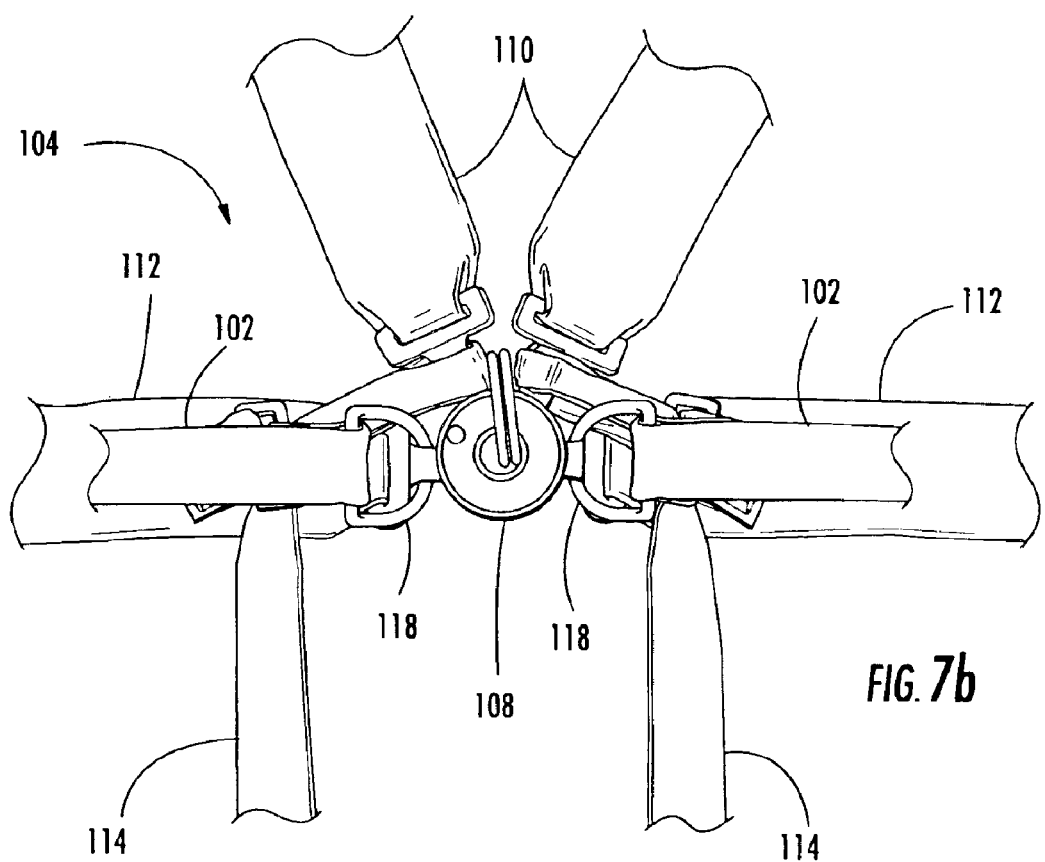
FIG. 7b is a fragmented front view of the restraint device of FIG. 5, showing in particular still another arrangement for anchoring the device to a vehicle's seat belt assembly, wherein the strap is secured to the seat belt assembly by lap belts.
Figure 7C:
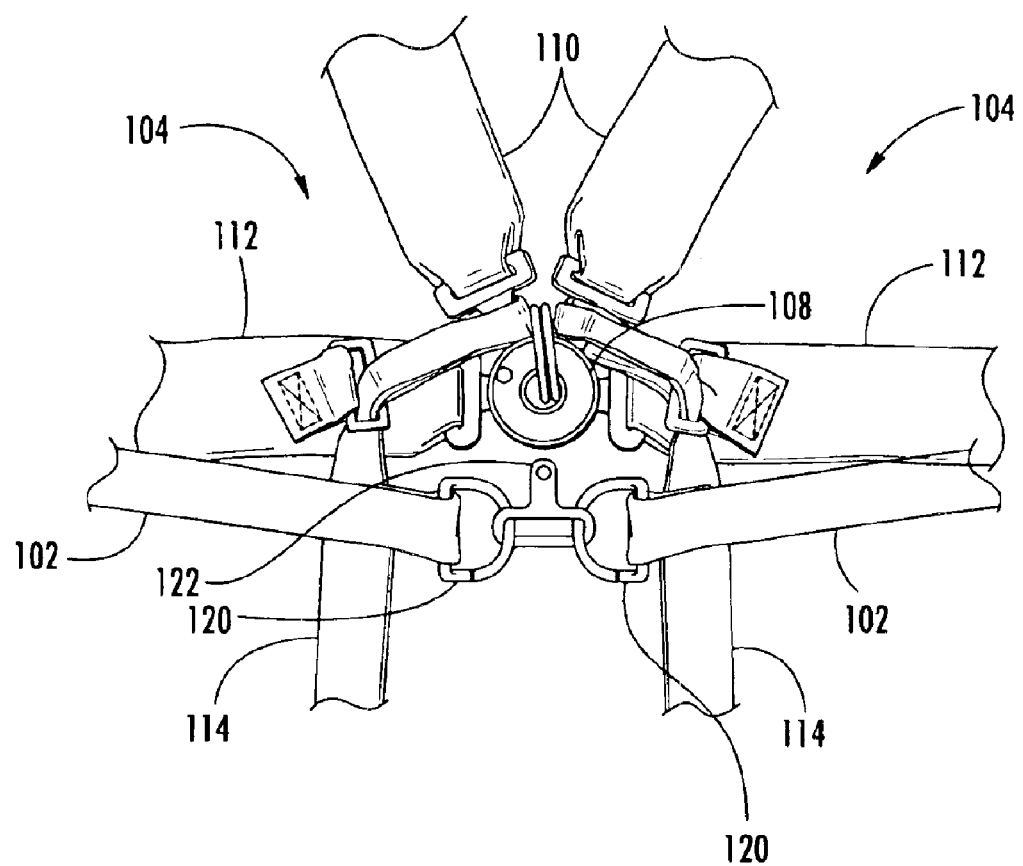
FIG. 7c is a fragmented front view of the restraint device of FIG. 5, showing in particular another arrangement for anchoring the device to the vehicle's seat belt assembly, wherein the strap is secured to the seat belt assembly by being clipped into a camlock.

The restraint device 100 further includes at least one strap 102 for anchoring the device 100 to the vehicle's seat belt assembly 104 (FIGS. 7a–7c). The strap 102 may be affixed, or releaseably attachable, to the member 12 by any suitable means. In the illustrated embodiment, the strap 102 is affixed to the member 12 by weaving the strap 102 through slots 106 (FIG. 5) formed in the member 12 and then adhesively affixing the intermediate section of the strap 102 to the member 12. The end sections of the strap 102 extend over the driver's hips and are provided with suitable means, such as a loop, ring, clip, tongue, or the like, for releaseably attaching to the seat belt assembly (FIGS. 7a–7c). Length adjustment of the strap 102 may be allowed for by a webbing tie, or other suitable means.

It is to be understood that the position of the strap 102 along the member 12 may vary in order to allow for the strap 102 to be routed over the driver in areas other than his hips. For example, the strap 102 may be attached in a position on the member 12 so that the strap 102 is routed around the driver's waist or over the torso when anchored to the seat belt assembly 104.

FIGS. 7a–7c are exemplary of different ways in which the strap 102 may be attached to the seat belt assembly 104. The illustrated seat belt assembly 104 is a standard five or six point seat belt assembly 104 commonly used in high-performance vehicle racing that utilizes a cam lock 108 to secure the various belts. It is to be understood that the teachings herein are applicable to other seat belt assemblies and to other belt securing mechanisms.

Referring to FIGS. 7a–7c, the seat belt assembly 104 comprises shoulder belts 110, lap belts 112 and sub-belts 114 for securing a driver to the seat assembly 104. Each of the belts 110, 112, 114 has a tongued end for releaseably attaching the respective belt to the cam lock 108.

In the example illustrated by FIG. 7a, the restraint device strap 102 has a looped end 116 through which the tongues of the shoulder belts 110 may be received. Accordingly, by securing the shoulder belts 110 into the cam lock 108, the strap 102 is also secured to the seat belt assembly 104.

Referring to FIG. 7b, another example is provided wherein the strap 102 has ringed end 118 through which the tongues of the lap belts 112 may be received. As such, by securing the lap belts 112 to the cam lock 108, the strap 102 is also secured to the seat belt assembly 104.

Referring to FIG. 7c, still another example is provided wherein the strap 102 has clipped ends 120. The clipped ends 120 may be clipped onto a tongue 122, and the tongue 122 attached into the cam lock 108 in order to secure the strap 102 to the seat belt assembly 104.

Figure 8:
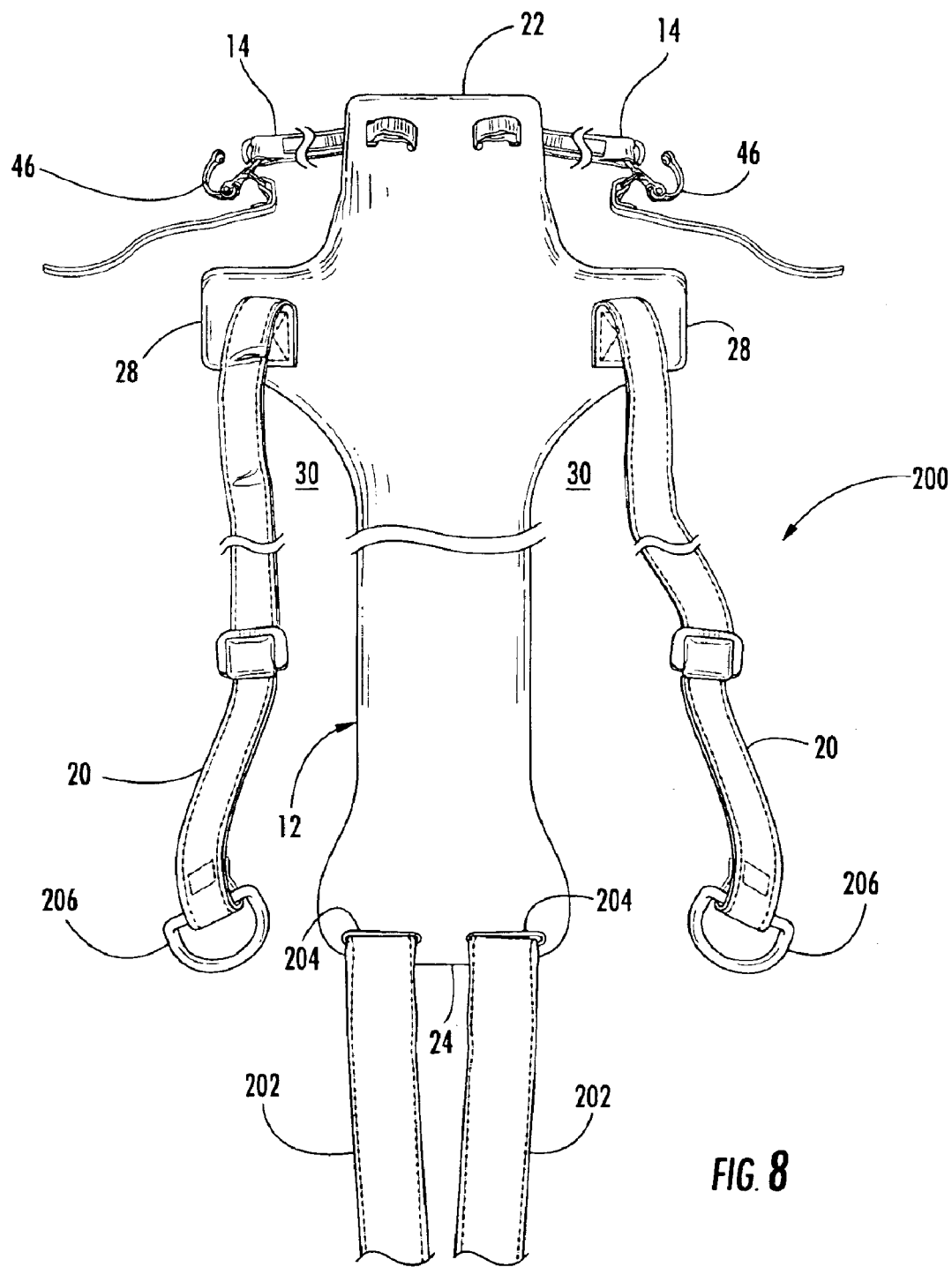
FIG. 8 is a front view of a restraint device having a strap, positionable between a driver's legs, for attachment and anchorage of the device into a vehicle's seat belt assembly in accordance with an exemplary embodiment of the present invention.
Figure 9:
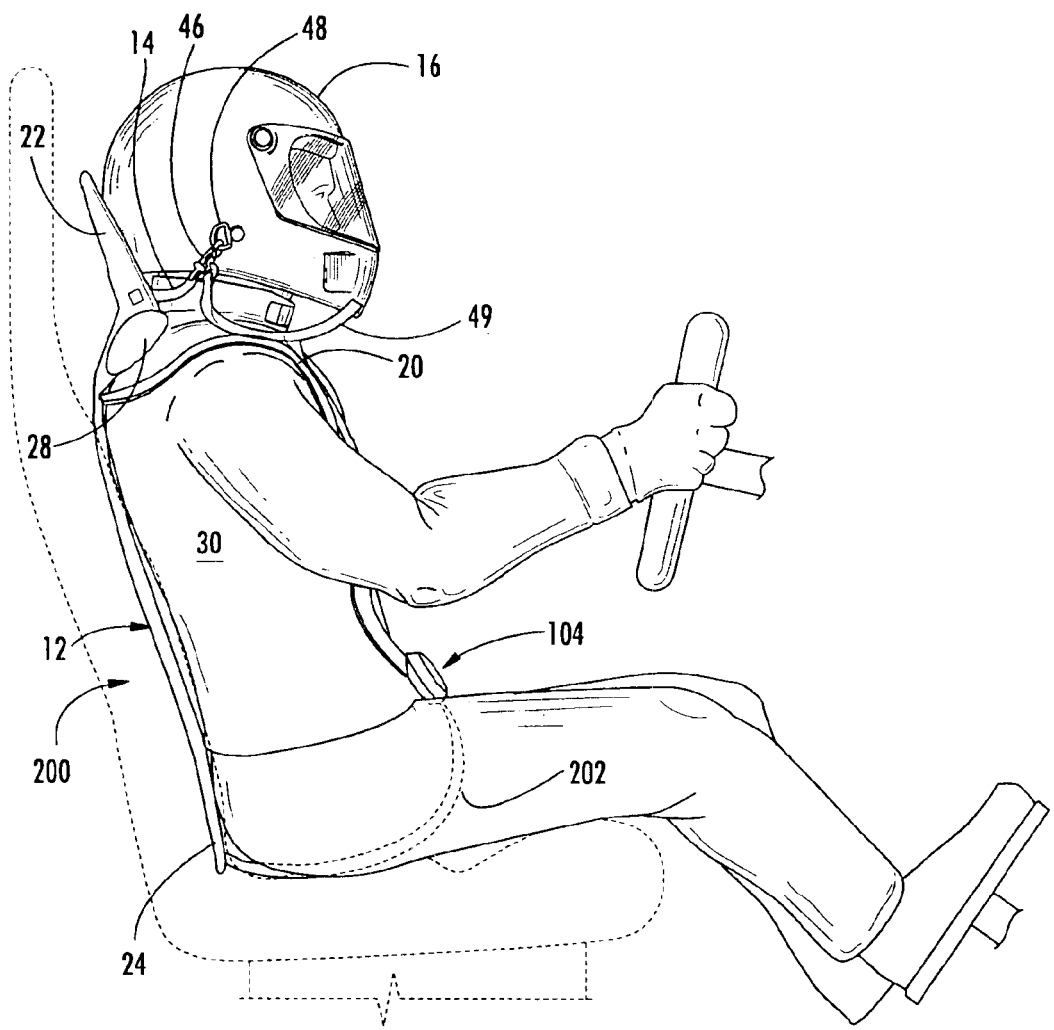
FIG. 9 is a side view of the restraint device of FIG. 8, showing the device in position on a driver during normal operation of a vehicle.

Referring to FIGS. 8 and 9, another embodiment of a restraint device 200 is illustrated. The device 200 comprises a member 12 having lateral extensions 28 and tether 14, each of which are as described above. Optional shoulder straps 20, similar to that as previously described, may be provided, but having end sections adapted for attachment to the seat belt assembly.

Figure 10A:
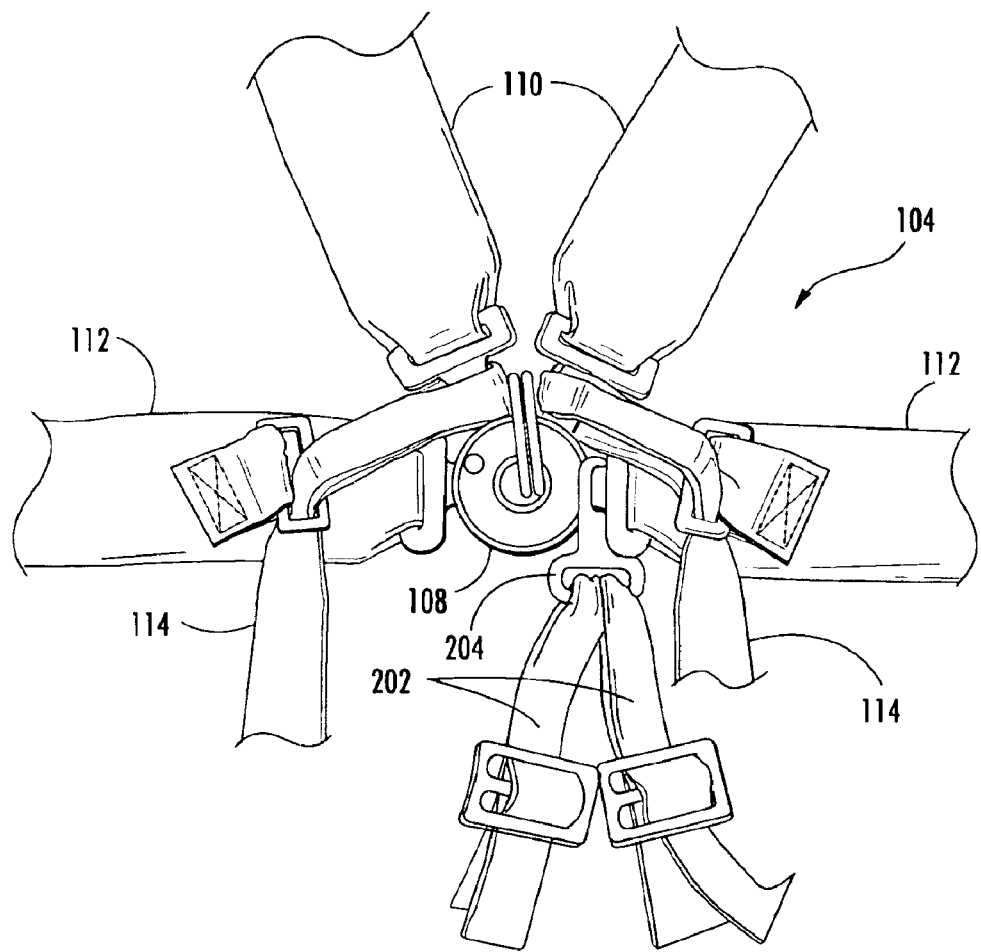
FIG. 10a is a fragmented front view of the restraint device of FIG. 8, showing in particular an arrangement for anchoring the device to the vehicle's seat belt assembly, wherein the strap is secured to the seat belt assembly by a lap belt.
Figure 10B:
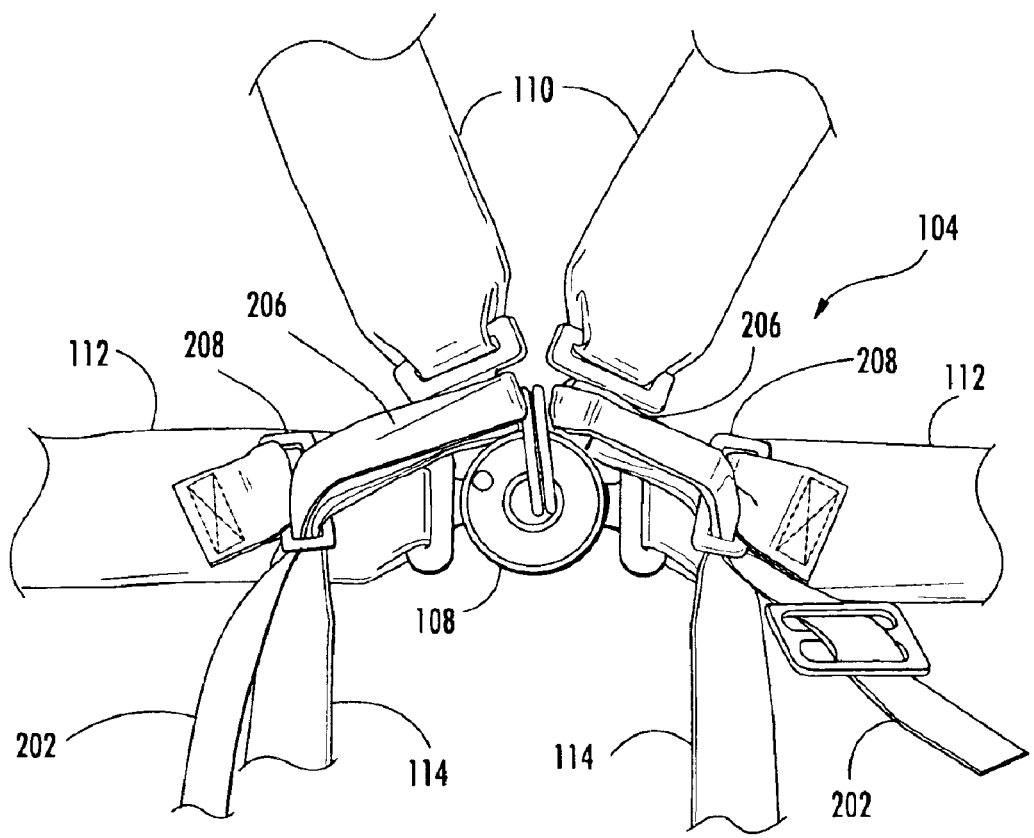
FIG. 10b is a fragmented front view of the restraint device of FIG. 8, showing in particular still another arrangement for anchoring the device to a vehicle's seat belt assembly, wherein the strap is secured to the seat belt assembly by shoulder belts.
Figure 10C:
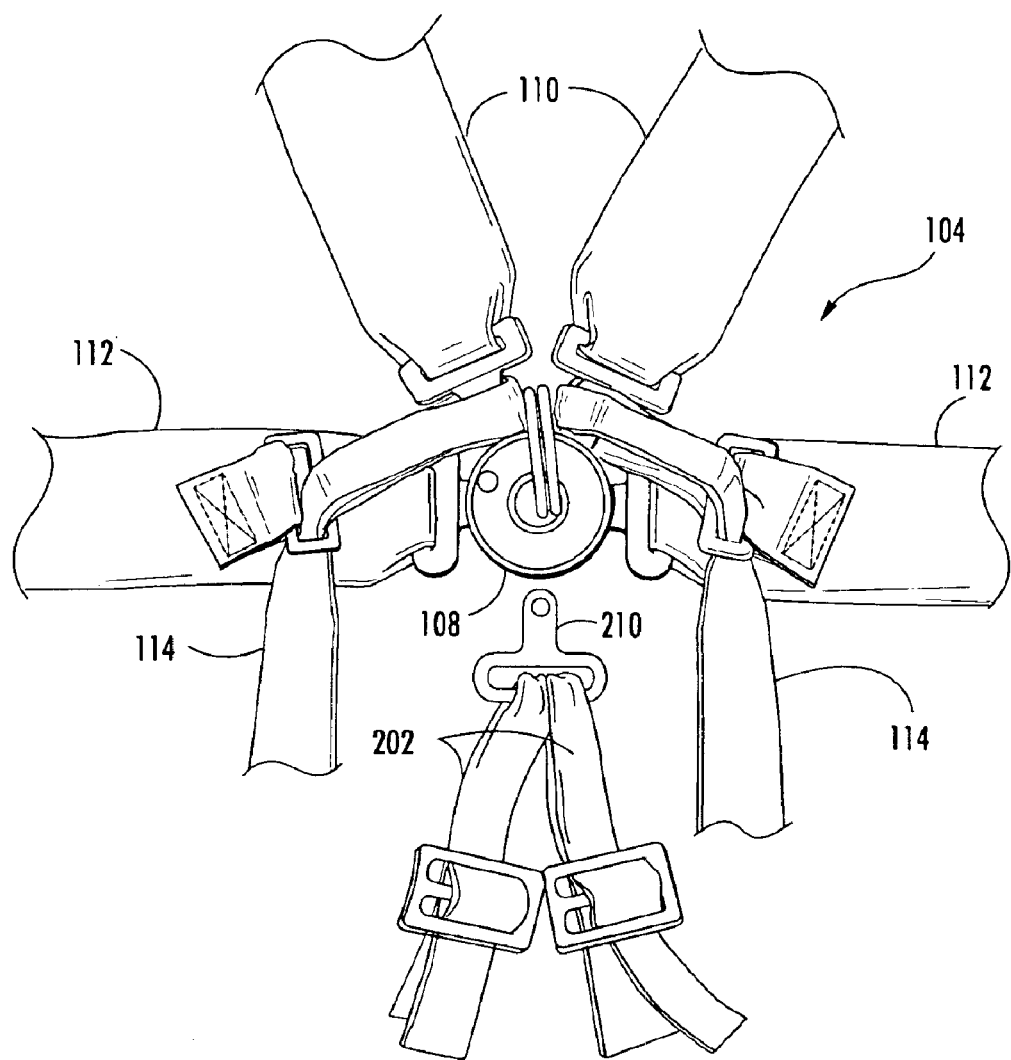
FIG. 10c is a fragmented front view of the restraint device of FIG. 8, showing in particular another arrangement for anchoring the device to the vehicle's seat belt assembly, wherein the strap is secured to the seat belt assembly by being clipped into a camlock.

The restraint device 200 also includes at least one strap 202 for anchoring the device 200 to the vehicle's seat belt assembly 104 (FIGS. 10a–10c). The strap 202 may be affixed, or releaseably attachable, to the member 12 by any suitable means. In the illustrated embodiment, the strap 202 is affixed to the member 12 by weaving the strap 202 through slots 204 (FIG. 8) formed in the member 12 and then adhesively affixing the intermediate section of the strap 202 to the member 12. As shown in FIG. 9, the end sections of the strap 202 extend between the driver's legs, and are provided with suitable means, such as a loop, ring, clip, tongue, or the like, for releaseably attaching to the seat belt assembly 104 (FIGS. 10a–10c). Length adjustment of the strap 202 may be allowed for by a webbing tie, or other suitable means.

The seat belt assembly 104 shown in FIGS. 10a–10c is as described above and as shown in FIGS. 7a–7c. That is, the seat belt assembly comprises shoulder belts 110, lap belts 112 and sub-belts 114 for securing a driver to the seat assembly 104. Each of the belts 110, 112, 114 has a tongued end for releaseably attaching the respective belt to the cam lock 108. It is to be understood that the examples provided for attaching the strap 202 to the seat belt assembly 104 are not exhaustive, and are merely illustrative of preferred arrangements.

In the example illustrated by FIG. 10a, the end sections of the restraint device strap 202 are attached to a ring 204 through which one of the lap belts 112 may be received. Accordingly, by securing the respective lap belt 112 to the cam lock 108, the strap 202 is also secured to the seat belt assembly 104. A spacer (not shown) may be provided for spacing the end sections apart in order to comfort the driver as the strap 202 passes along the groin.

Referring to FIG. 10b, another example is provided wherein the strap 202 has looped ends 206 through which the tongues of the shoulder belts 110 may be received. As such, by securing the shoulder belts 110 to the cam lock 108, the strap 202 is also secured to the seat belt assembly 104. The end sections of the strap 202 may be routed through optional D-rings 208 provided on the lap belts 112 in order to space the end sections apart in order to comfort the driver as the strap 202 passes along the groin.

Referring to FIG. 10c, still another example is provided wherein the end sections of the strap 202 are tied into a tongue 210. The tongue 210 may be attached into the cam lock 108 in order to secure the strap 202 to the seat belt assembly 104.

Figure 11:
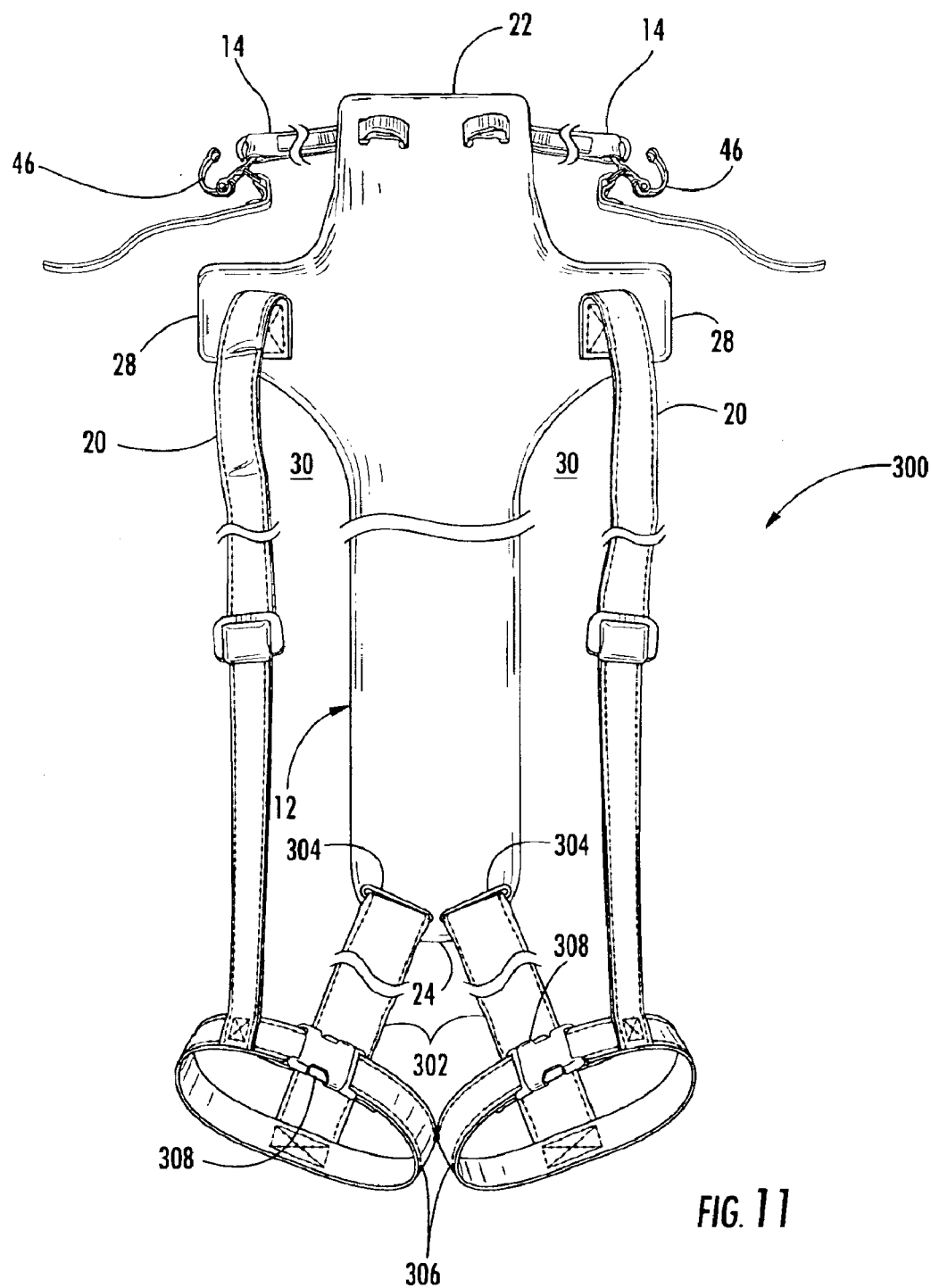
FIG. 11 is a front view of a restraint device having a strap encircling a driver's legs for anchoring the device to the driver's body in accordance with an exemplary embodiment of the present invention.
Figure 12:
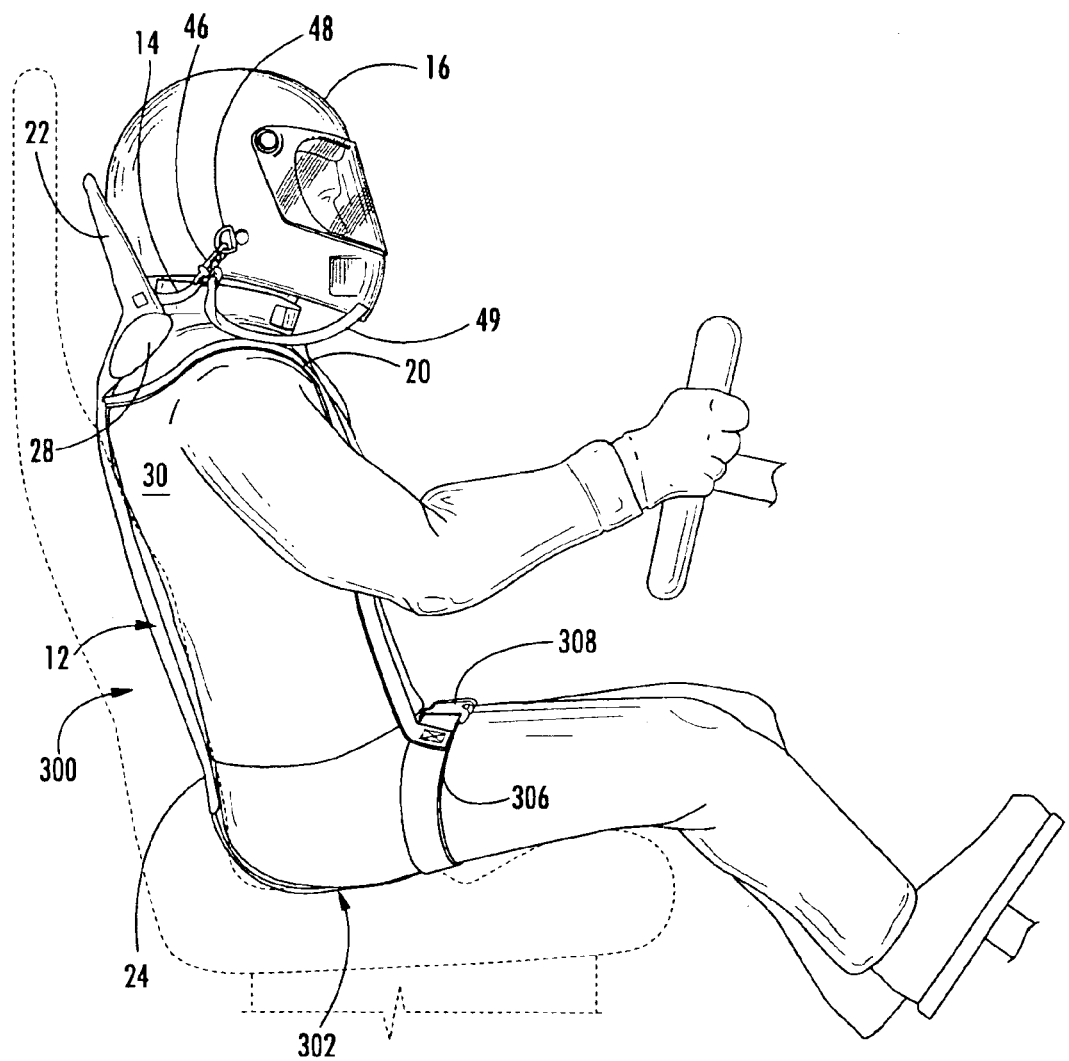
FIG. 12 is a side view of the restraint device of FIG. 11, showing the device in position encircling a driver's thighs during normal operation of a vehicle.
Figure 13:
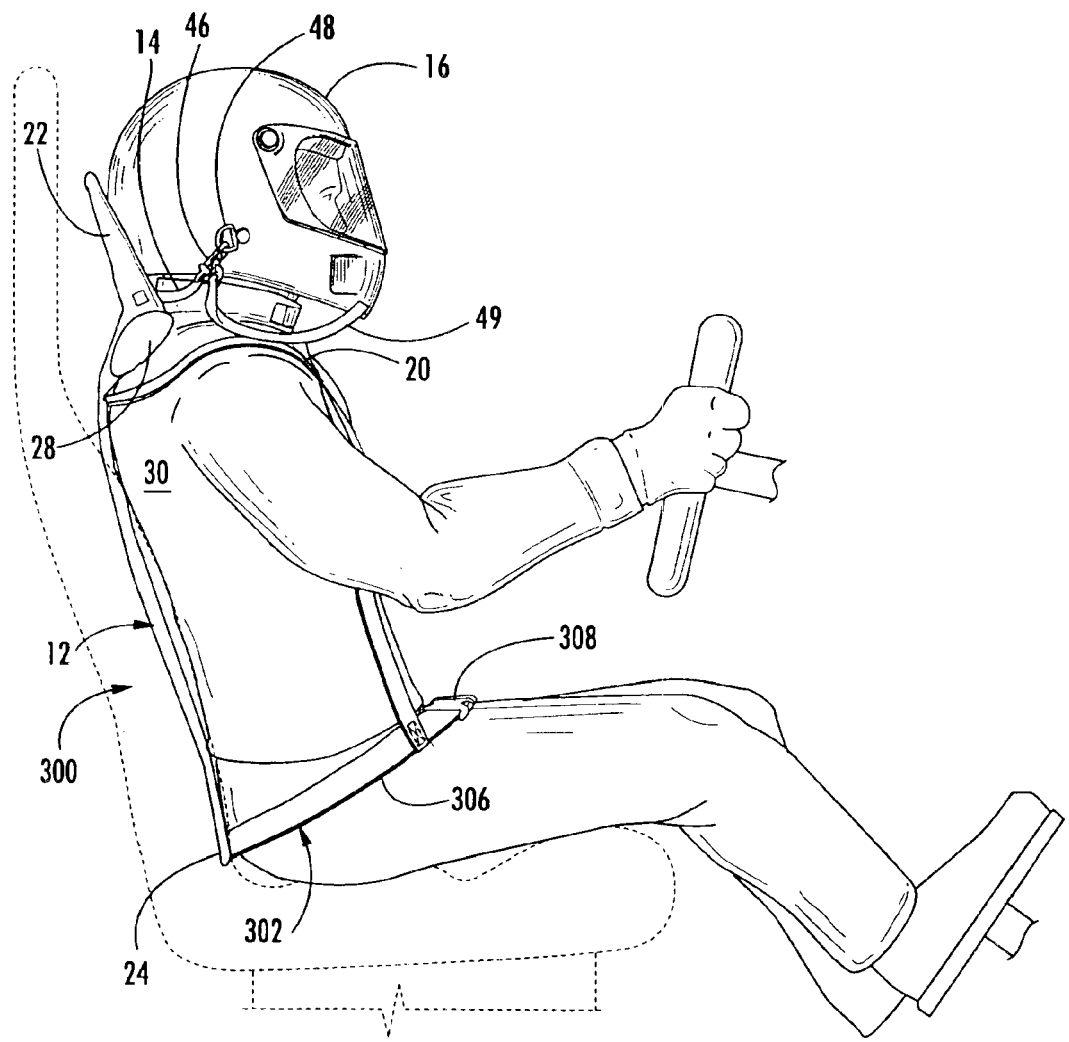
FIG. 13 is a side view of the restraint device of FIG. 11, showing the device in position around a driver's hips and inner thighs during normal operation of a vehicle.

Referring to FIGS. 11–13, another embodiment of a restraint device 300 is illustrated. The device 300 comprises a member 12 having lateral extensions 28, tether 14 and optional shoulder straps 20, each of which are as described above.

The restraint device 300 also includes at least one strap 302 for anchoring the device 300 to the driver's legs. The strap 302 is attached to the member 12 by any suitable means. In the illustrated embodiment, the strap 302 is affixed to the member 12 by weaving the strap 302 through slots 304 (FIG. 11) formed in the member 12 and then adhesively affixing the intermediate section of the strap 302 to the member 12. The strap 302 is provided with looped sections 306, through which the driver's legs are received. Means 308 may be provided for allowing the looped sections 306 to be tightened and/or to be releaseably coupled around the driver's legs.

The location at which the strap 302 encircles the driver's legs may vary. For example, FIGS. 11 and 12 illustrate that the looped sections 306 may spaced from the member 12 so that the strap 302 is anchored around the driver's upper thigh. In comparison, FIG. 13 shows that the looped sections 306 may be positioned close to the member 12 so that they are routed around the driver's hips and inner thigh.

Figure 14:
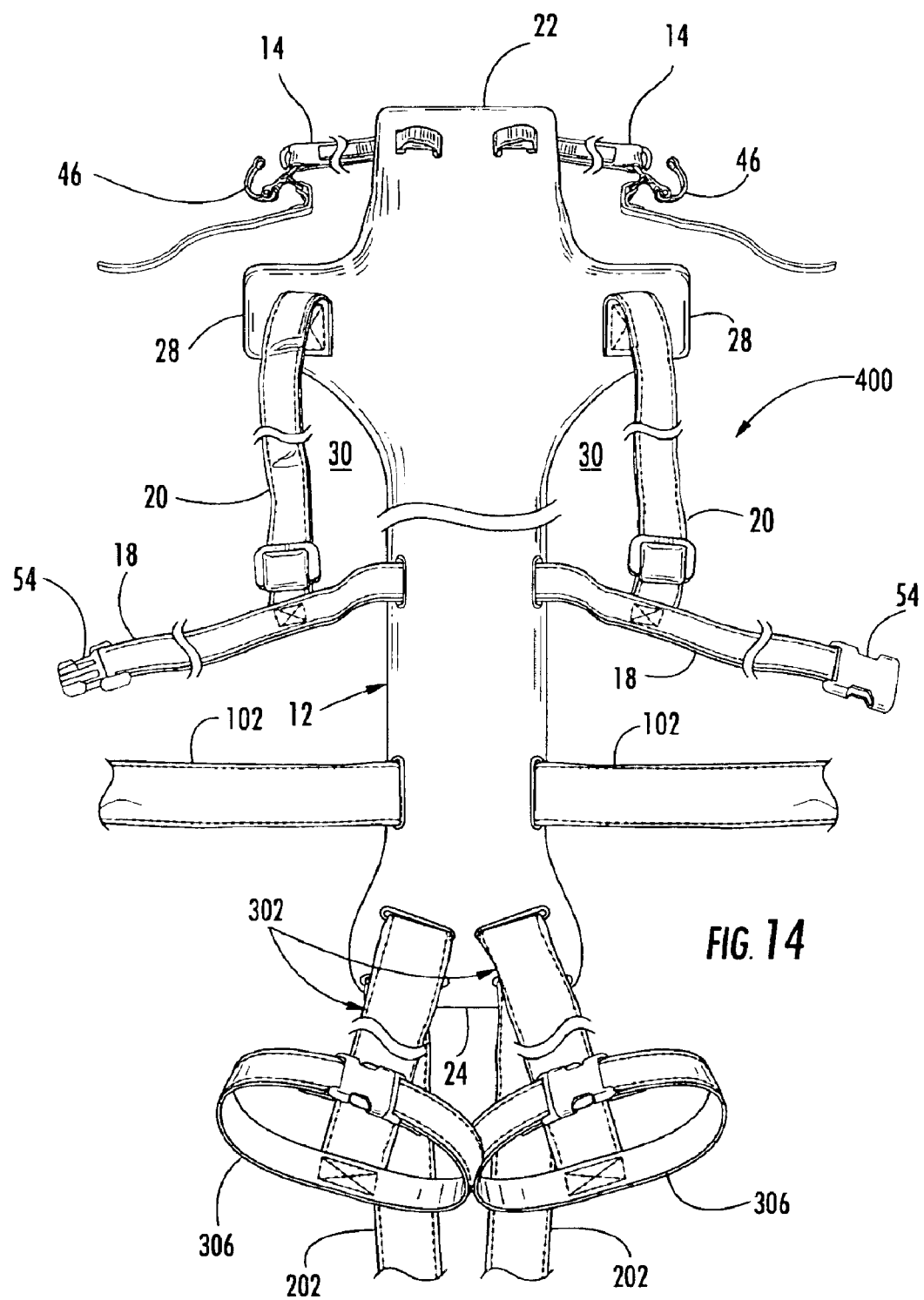
FIG. 14 is a front view of a restraint device showing that any of the various strap arrangements for anchoring the device as illustrated in the previous FIGS. may be combined into one device in accordance with an exemplary embodiment of the present invention.

Referring to FIG. 14, a restraint device 400 is illustrated showing that any of the above embodiments may be combined in order to provide additional anchorage. The device 400 comprises a member 12 having lateral extensions 28, tether 14 and optional shoulder straps 20, each of which is as described above. Furthermore, the device 400 includes straps 18, 102, 202, 302 in accordance with the respective previous embodiments.

Figure 15:
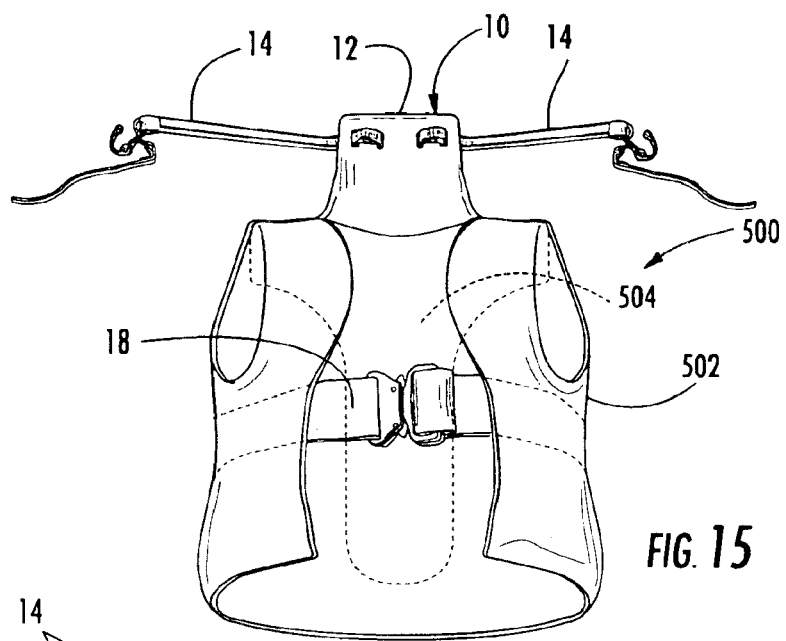
FIG. 15 is a front view of a restraint device integrated with a vest in accordance with an exemplary embodiment of the present invention.

Referring to FIG. 15, any of the previous embodiments of the restraint device may be integrated into a racing vest or suit, as generally illustrated by reference number 500. For illustrative purposes, the embodiment of the restraint device 10 described in accordance with FIGS. 1 and 2 is shown configured with a racing vest 502. Preferably, the vest 502 is provided with a pocket 504 into which the member 12 is received. Alternatively, adhesive, stitching, complementary hook and loop fasteners, complementary snaps, or the like, may also be used to attach the restraint device 10 to the vest 502.

The vest 502 allows for the restraint device 10 to be easily carried on the driver without the need for shoulder straps. Additionally, the vest 502 may accommodate additional safety equipment such as providing padding or shielding against impact to the driver's kidneys.

Figure 16:
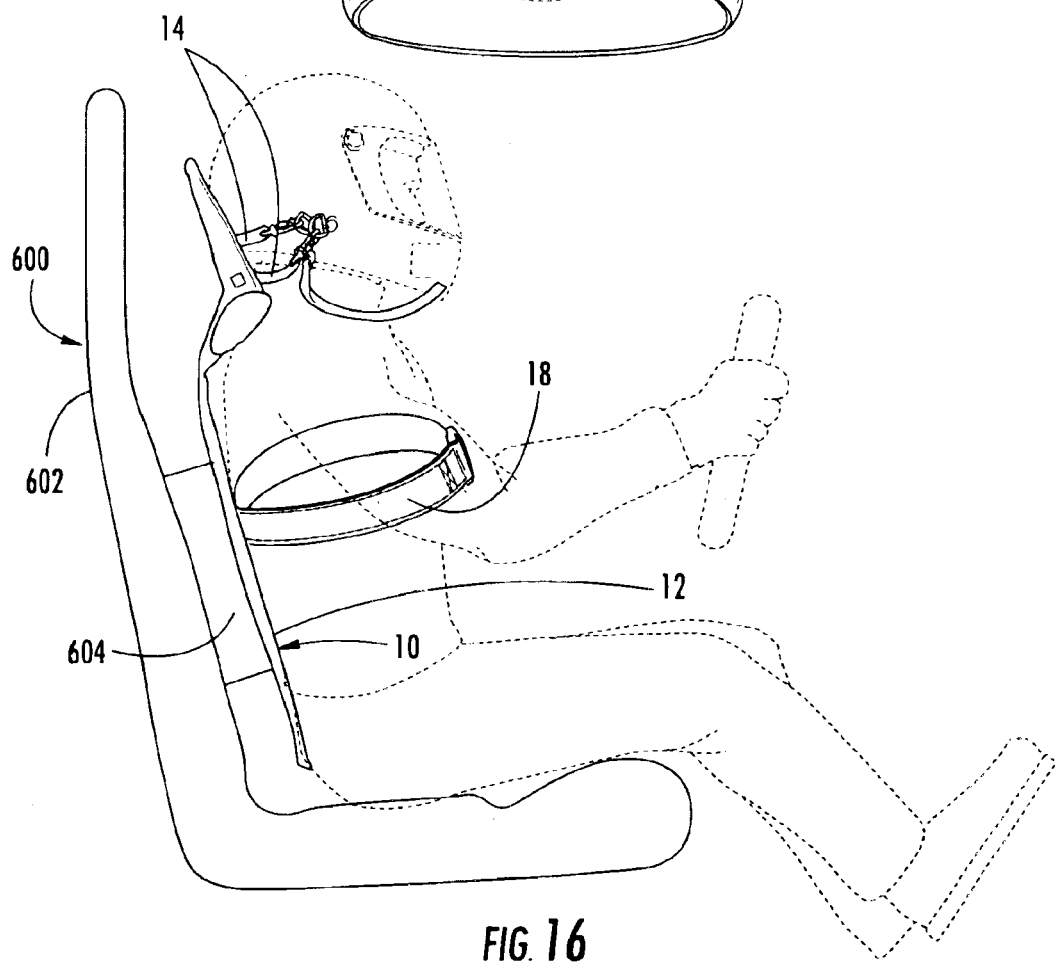
FIG. 16 is a side view of a restraint device, wherein the device is releaseably carried on the seat assembly in accordance with an exemplary embodiment of the present invention.

As generally identified by reference number 600 in FIG. 16, any of the previous embodiments may be carried by the driver's seat 602. For illustrative purposes, the embodiment of the restraint device 10 described in accordance with FIGS. 1 and 2 is shown attached to the seat 602. Means 604 is provided for releaseably attaching the restraint device 10 to the seat 602. For example, the seat 604 and restraint device 10 may be attached together by complementary hook and loop fasteners, complementary snaps, providing a pocket attached to the seat by complementary hook and loop fasteners into which the restraint device member 12 is received, or the like.

By attaching the device 10 to the seat 602, the device 10 may remain in place in the vehicle while the driver enters or exits the vehicle. Once inside the vehicle, the driver properly attaches the device 10 to the helmet and to the anchor. If a collision were to occur, the device 10 would be carried by the driver's forward movement and quickly released from the seat 602 in order to fully function.

In use, and referring to FIG. 4, the restraint device 10 is positioned on the driver, with the member 12 disposed along the back of the driver, the tether 14 attached to the helmet 16, and the strap 18 attached to the anchor, which in this embodiment is the driver's torso. The restraint device 10 is then seated to the driver by adjusting the tether 14 and/or strap, as necessary. The seat belt assembly is also applied to the driver, securing the driver to the seat assembly.

In this secured position, the tether 14 has enough slack in order to allow the driver to pivot his head a range sufficient to look in the directions necessary for racing the vehicle. Not to be construed as limiting, preferably about one inch of slack is provided before the tether 14 is caused to be placed in tension. This additional inch correlates to head rotation of about twenty degree in both directions, which is sufficient for the driver to fully use the vehicle's mirrors. In the case of using a dashpot, slack may not be necessary as the driver will remain free to move his head during normal conditions, but upon a collision the dashpot will become fixed in length in order to restraint the driver's head.

Upon a collision, particularly a frontal or angular frontal collision, the driver continues forward, relative to the seat assembly, as the belts of seat belt assembly initially stretch against the load then restrains forward movement of the driver's torso. The member 12, being carried forward with driver, maintains the allotted amount of relative movement between the head and torso that was provided during normal operation of the vehicle. That is, the driver's head continues a short distance forward and begins to pivot downwards, before any slack in the tether 14 is taken up. The tether 14, once in tension, opposes continued forward movement and downward rotation of the driver's head by transferring loads through the restraint device 10 to the anchor. Accordingly, by controlling the driver's head, the likelihood of injury to the driver is decreased. As it will be appreciated by those skilled in the art of high-performance vehicle safety devices, the various embodiments described herein each function in this manner. That is, forward movement and downward rotation of the driver's head is opposed by transferring loads through the restraint device (tether, member and strap) to the anchor (for example, the driver, his torso, waist, legs, and/or seat belt assembly).

Advantageously, if a collision does occur, the restraint device 10 requires no additional acts by the driver or racing crew in order for the driver to egress the vehicle. That is, whether the restraint device 10 is anchored to the driver or to the seat belt assembly, the driver may escape from the vehicle by releasing the seat belt assembly and then egresses the vehicle in a conventional manner. If greater freedom of head movement is desired in order to ease the driver's egress from the vehicle, the tether 14 may be quickly be released from the helmet 16 by simply pulling the clip lines 49.

That which is claimed is:

1. A restraint device for controlling a driver's head during a vehicle collision, comprising:

a member;

a tether attached to said member and attached to a helmet;

a strap attached to said member and for being attached to a vehicle seat belt assembly; and wherein the seat belt assembly anchors the driver's head to control movement of the driver's head during a vehicle collision.

2. The restraint device in accordance with claim 1 wherein at least a portion of said strap is positioned between the driver's legs when the restraint device is in place on the driver.

3. The restraint device in accordance with claim 1 wherein at least a portion of said strap is positioned over the driver's torso when the restraint device is in place on the driver.

4. The restraint device in accordance with claim 1 wherein at least a portion of said strap is positioned at least partially around the driver's waist when the restraint device is in place on the driver.

5. The restraint device in accordance with claim 1 wherein vehicle seat belt assembly includes a cam lock and said strap is adapted to be attached to said cam lock.

6. The restraint device in accordance with claim 5 wherein the driver is freed from being secured to the vehicle by releasing said strap from said cam lock.

7. The restraint device in accordance with claim 1 wherein the vehicle seat belt assembly includes a lap belt and said strap is adapted to be attached at the lap belt.

8. The restraint device in accordance with claim 7 wherein said restraint device and the driver are freed from being secured to the vehicle by uncoupling the lap belt.

9. The restraint device in accordance with claim 1 wherein the vehicle seat belt assembly includes a shoulder belt and said strap is adapted to be attached at the shoulder belt.

10. The restraint device in accordance with claim 9 wherein said restraint device and the driver are freed from being secured to the vehicle by uncoupling the shoulder belt.

11. The restraint device in accordance with claim 1 wherein the vehicle seat belt assembly includes a cam lock said strap is adapted to be attached to the seat belt assembly by said cam lock and wherein said restraint device and the driver are freed from being secured to the vehicle by releasing said strap from said cam lock and wherein said driver may egress from the vehicle while said restraint device is attached to and being carried by the driver.

12. A restraint device for controlling a driver's head during a vehicle collision, comprising:

a rigid member;

a tether attached to said rigid member and attached to a helmet;

a strap attached to said rigid member and attached to a part of the driver's body; and wherein the driver's body anchors the driver's head to control movement of the driver's head during a vehicle collision.

13. The restraint device in accordance with claim 12 wherein the part of the driver's body to which said strap is attached is the driver's torso.

14. The restraint device in accordance with claim 13 wherein said restraint device is not attached to a vehicle seat belt assembly and wherein the driver and the restraint device are freed from being secured to the vehicle by releasing the driver from the vehicle seat belt assembly.

15. The restraint device in accordance with claim 12 wherein the part of the driver's body to which said strap is attached is the driver's legs.

16. The restraint device in accordance with claim 15 wherein said restraint device is not attached to a vehicle seat belt assembly and wherein the driver and the restraint device are freed from being secured to the vehicle by releasing the driver from the vehicle seat belt assembly.

17. The restraint device in accordance with claim 12 wherein said restraint device is attached only to the driver's body.

18. An apparatus for controlling a driver's head during a vehicle collision, comprising:

a vehicle having a seat belt assembly;

a restraint device comprising a member, a tether attached to said member and attached to a helmet, and a strap attached to said member and to said seat belt assembly, wherein the seat belt assembly and restraint device cooperate to control the movement of a driver's head during a vehicle collision; and wherein said restraint device and the driver are freed from said seat belt assembly and from being secured to the vehicle by releasing said vehicle seat belt assembly.

19. The apparatus in accordance with claim 18 wherein said vehicle seat belt assembly includes a lap belt, and wherein said strap is attached at said lap belt, and wherein the driver and said restraint device are freed form said belt assembly and from being secured to the vehicle by opening said lap belt.

20. The apparatus in accordance with claim 18 wherein said vehicle seat belt assembly includes a lap belt and a cam lock, and wherein the driver and said restraint device are freed from said seat belt assembly and from being secured to the vehicle by releasing said strap from said cam lock.

* * * * *

UNITED STATES PATENT AND TRADEMARK OFFICE
CERTIFICATE OF CORRECTION

PATENT NO. : 6,931,669 B2  
APPLICATION NO. : 10/728003  
DATED : August 23, 2005  
INVENTOR(S) : Trevor P. Ashline It is certified that error appears in the above-identified patent and that said Letters Patent is hereby corrected as shown below:

Col. 14 Claim 18, line 19, after "seat" insert --belt--.

Col. 14 Claim 19, line 23, delete "form" and insert therefor --from--.

Signed and Sealed this

Twenty-fourth Day of June, 2008

JON W. DUDAS  
*Director of the United States Patent and Trademark Office*